Nov. 21, 1961     G. POFFERI     3,009,693
FURNITURE SPRING ASSEMBLIES
Filed April 28, 1959
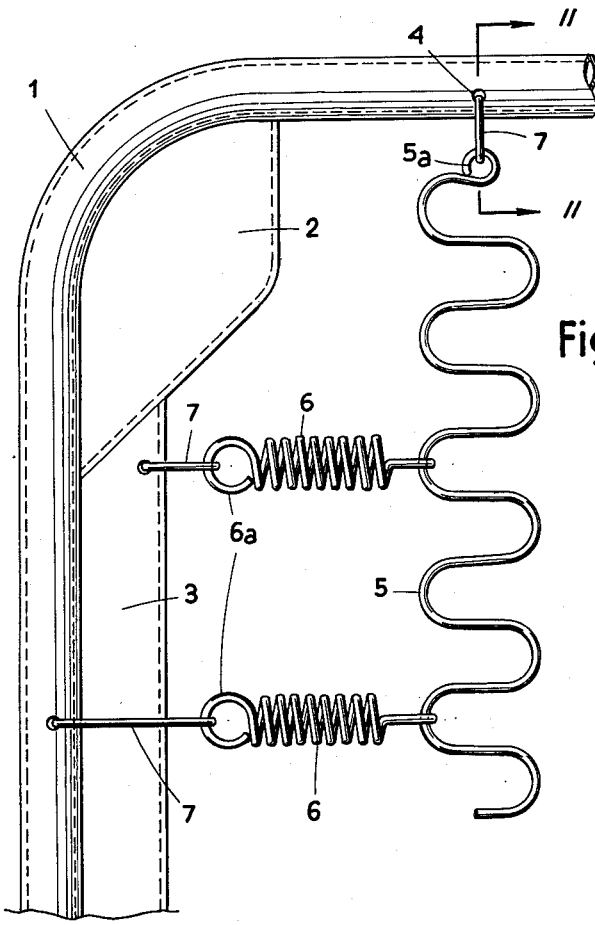
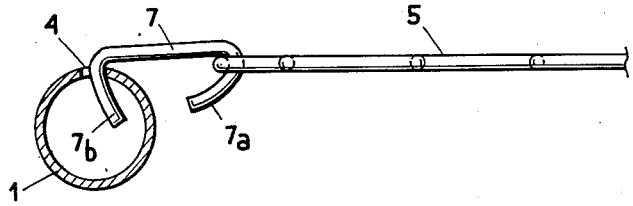
INVENTOR:
GIANCARLO POFFERI
By
Richardson, David and Nordon
ATTYS

United States Patent Office 3,009,693
Patented Nov. 21, 1961

3,009,693
FURNITURE SPRING ASSEMBLIES
Giancarlo Pofferi, Prato, Florence, Italy, assignor to Ital-Bed Costruzione Letti ed Affini Società a Responsabilità Limitata, Pistoia, Italy
Filed Apr. 28, 1959, Ser. No. 809,567
Claims priority, application Italy May 10, 1958
1 Claim. (Cl. 267—112)

This invention concerns furniture spring assemblies, that is to say bed, chair, settee or like spring assemblies intended to provide resilient supporting surfaces for mattresses, cushions, chairbacks, upholstery and similar purposes.

The invention is more particularly concerned with spring assemblies comprising a plurality of resilient members which provide the resilient supporting surface and which are secured to an outer frame. The problem of securing the resilient members to the frame is substantial, since the connection between the members and the frame must allow at least restricted relative movement. At the same time it is undesirable to provide any arrangement giving rise to even the softest noises which are not tolerable, for example in bed spring assemblies, wherein the supporting surface is subjected to numerous and frequent changes in stress.

A furniture spring assembly according to this invention comprises a frame and resilient members providing a resilient supporting surface characterised by connectors connecting the resilient members to the frame, said connectors each comprising a linear element bent at each end to provide hooks one of which engages with a resilient member and the other of which is accommodated in a corresponding hole in the frame.

One hook of each connector may be slightly more closed than the other whereby the latter may be inserted easily downwards into a frame hole and will readily assume a position, wherein both hooks are downwardly directed, imposed thereon by the tension of the elastic members of the assembly.

The invention will be described further, by way of example, with reference to the accompanying drawings, in which:

FIG. 1 is a fragmentary plan view of a spring assembly in accordance with the invention, and FIG. 2 is a sectional elevation corresponding to the line II—II of FIG. 1.

In the drawings, the spring assembly illustrated comprises a frame 1 which is of tubular form, and which is reinforced by corner plates 2 and by ribs 3. Holes 4 (see FIG. 2) are provided in the frame, and these holes have their axes vertical.

Two forms of resilient members 5 and 6 are shown and these are in mutual co-operation to provide a resilient supporting surface of the assembly. The members 5 are flat serpentine springs, while the members 6 are helical springs.

Connectors 7 are provided for connecting the members 5, 6 to the frame in such a manner as to avoid assembly difficulties and to avoid creaking which often occurs when the resilient members are connected directly to the frame or are connected with certain complex systems hitherto employed. Each connector comprises a linear element of wire, rod or the like which is bent at each end to provide two hooks 7a and 7b (see particularly FIG. 2). As shown in the drawing, the hook 7a is slightly more closed than the hook 7b with respect to the straight body of the element. Eyelets 5a and 6a, respectively, which are formed before hardening of the springs are provided on the elastic members 5 and 6 and the hooks 7a of the connectors 7 engage into such eyelets. The hooks 7b are accommodated in the respective holes 4 in the frame, and the fact that such hooks are slightly less closed than the hooks 7b and are shaped as shown facilitates their entry into such holes.

On the one hand, the construction according to the invention simplifies the connection of the resilient members to the frame of the assembly and provides a construction wherein creaking due to relative movement between the resilient members and the frame is eliminated. On the other hand, the presence of the hooks of the connectors does not affect the practical use of the assembly, and these hooks cannot contact fabric supported by the assembly.

The invention is not confined to the precise details of the foregoing example which serves only to illustrate one form the invention may take. Any form of resilient element or frame may be used and the holes in the frame can be positioned, if desired, so that their axes are at an angle to the vertical.

What I claim is:

A silent flexing elastic net for a bed, sofa and the like, comprising a planar tubular frame provided with spaced holes in an upper central portion thereof, a flat apertured rib extending laterally of said frame at an inner side thereof, a flat undulating serpentine spring disposed in a plane parallel to the plane of said frame and rib, said spring having one end bent to form a closed flat eyelet coplanar with the plane of the spring, a first rigid flat connector engaged between a certain hole in the frame and the eyelet of said spring, a plurality of coil springs having opposite ends bent to form further closed flat eyelets disposed in mutually perpendicular planes, the eyelets at one end of said coil springs being perpendicular to the plane of the flat spring and engaged on undulations of the flat spring, and second rigid flat connectors engaged between other holes in said frame and rib and the eyelets at the other ends of the coil springs, each of the first and second connectors being a flat generally U-shaped member consisting of a straight wire element having opposite ends bent at different acute angles thereto to form hooks, the hooks of said connectors defining larger acute angles having bights engaged in the holes in the frame and rib, the hooks defining smaller acute angles having bights engaged in the eyelets of the springs, the hooks of the connectors being bent at such angles that the free ends thereof remain spaced from the eyelets, rib and frame at all positions of flexure of the springs, all the connectors being disposed in planes perpendicular to the planes of the frame, ribs and serpentine springs, whereby all the springs flex silently.

References Cited in the file of this patent

UNITED STATES PATENTS

| | | |
|---|---|---|
| 1,906,233 | Leigh | May 2, 1933 |
| 1,918,761 | Kronheim | July 18, 1933 |
| 2,241,851 | Rivard et al. | June 10, 1947 |

FOREIGN PATENTS

| | | |
|---|---|---|
| 175,357 | Austria | July 10, 1953 |
| 1,077,476 | France | Apr. 28, 1954 |
| 495,558 | Italy | June 18, 1954 |